United States Patent [19]
Watanabe et al.

[11] Patent Number: 5,720,206
[45] Date of Patent: Feb. 24, 1998

[54] ACTUATOR DEVICE

[75] Inventors: Akira Watanabe; Shiro Kishimoto; Takeshi Sugiyama, all of Tokyo, Japan

[73] Assignee: Mitsubishi Denki Kabushiki Kaisha, Tokyo, Japan

[21] Appl. No.: 687,950

[22] Filed: Jul. 26, 1996

[30] Foreign Application Priority Data

Jan. 17, 1996 [JP] Japan ............... 8-006139

[51] Int. Cl.⁶ ............... F16H 57/04
[52] U.S. Cl. ............... 74/606 A; 74/421 A; 74/606 R
[58] Field of Search ............... 74/421 A, 606 R, 74/606 A; 454/370

[56] References Cited

FOREIGN PATENT DOCUMENTS 63-52629  4/1988  Japan.
64-41639  3/1989  Japan.

*Primary Examiner*—Harold Joyce
*Attorney, Agent, or Firm*—Sughrue, Mion, Zinn, Macpeak & Seas, PLLC

[57] ABSTRACT

An actuator device designed to prevent intrusion of water into a control section housing chamber due to an breathing operation and hence malfunction and fracture of a control section. In the actuator device, a ventilating opening is provided in a partition between a mechanism section housing chamber and a control section housing chamber for communicating the mechanism section housing chamber and the control section housing chamber, a cylindrical protrusion is provided in the partition on the side of the mechanism section housing chamber so as to surround the ventilating opening; and a drain hole for communicating said mechanism section housing chamber with outside air is provided at a position lower than that of the ventilating opening of said mechanism section housing chamber.

6 Claims, 3 Drawing Sheets

ACTUATOR DEVICE

BACKGROUND OF THE INVENTION

1. Field of the Invention

The present invention relates to an actuator device to which an electric circuit for control is integrated, and more particularly to a waterproof mechanism for the actuator.

2. Related Art

FIG. 4 is a sectional view of an actuator to which an electric circuit (hereinafter referred to as a control section) conventionally used is integrated. In the figure, reference numeral 1 denotes a case and reference numeral 2 denotes a cover, for a mechanism section, defining a mechanism section housing chamber 3 with the case 1. In the mechanism section housing chamber 3, a motor 3a serving as a power source and a group of speed-reduction gears 3b to 3f are provided. The rotation of the motor 3a, which is speed-reduced through the group of gears 3b to 3f, is transmitted to a motive force output member 3a. Reference numeral 4 denotes a control section housing chamber defined by the case 1 and a control section cover 5. In the control section housing chamber 4, a control section 4a which is a control circuit for controlling the rotary speed, rotating direction, stopping position of the motor 3a, etc is provided. The control section 4a receives electric power from outside through a connector 6 having a terminal (not shown), and controls the motor 3a in response to a control signal.

Reference numeral 7 denotes a sealing member provided between the case 1 and the mechanism section cover 2. Intrusion of water into the mechanism section housing chamber 3 from outside is controlled by this sealing member 7. Waterproof for the control section housing chamber 4 is made by welding the fitting portion of the case 1 and the control section cover 5, or filling the portion with an adhesive. Thus, functional inconvenience or fracture of the control section 4a by intrusion of water is prevented.

As described above, the conventional actuator to which the control section 4a is integrated, which adopts a waterproof structure in which the sealing member 7 is used or the control section cover 5 and the case 1 are welded, has great water proof capability against ordinary water pouring from outside. However, such a structure is very hard to seal the mechanism section chamber 3 and the control section housing chamber 4. This inevitably leads to a breathing operation for temperature changes. For example, when the actuator (e.g. actuator for a vehicle) which is used at a high environmental temperature is abruptly cooled from a high temperature by water pouring for the purpose of washing or the like, water sucking into the control section housing chamber 4 necessarily occurs owing to the breathing operation. In this case, the above waterproof structure rather serves as an obstacle for drainage of intruded water, thus accumulating water within the control section housing chamber 4. This would give rise to malfunction of the control section 4a due to water deposition thereon, and fracture of circuits in the control section 4a in an extremely case. Further, water sucking due to the breathing operation occurs in not only the control section housing chamber 4 but also the connector section 6 having a waterproof structure. As the case may be, this would lead to short-circuiting between terminals not shown.

SUMMARY OF THE INVENTION

The present invention has been completed to solve the problem described above, and intends to provide a reliable control-section integrated actuator, which is free from water sucking due to a breathing operation for the control section housing chamber 4 and the connector section 6 when water pouring at a high temperature is executed, and hence from malfunction or fracture of a control circuit 4a due to water intrusion.

An actuator device according to the present invention comprises a mechanism section housing chamber for housing a mechanism section generating power and transmitting it to outside; a control section housing chamber configured integrally to said mechanism section housing chamber for housing a control section controlling said mechanism section; a partition arranged between said mechanism section housing chamber and said control section housing chamber for isolating these chambers from each other; a ventilating opening provided in said partition and communicating said mechanism section housing chamber and said control section housing chamber; a cylindrical protrusion provided in the partition on the side of the mechanism section housing chamber so as to surround the ventilating opening; and a drain hole for communicating said mechanism section housing chamber with outside-air, the drain hole being provided at a position lower than that of the ventilating opening of said mechanism section housing chamber.

In the mechanism section housing chamber constituted by a case and a mechanism section cover, a waterproof wall is provided in the mechanism section cover so that it is inscribed to the inner surface of the mechanism section cover through a small gap, and the small gap formed between said mechanism section cover and said waterproof wall is partially enlarged so that a drain hole is provided at the enlarged portion.

There provided are a connector section for supplying a control signal and power to said control section and a ventilating opening for communicating said connector section and said mechanism section housing chamber.

DETAILED DESCRIPTION OF THE PREFERRED EMBODIMENTS

Embodiment 1

Figure 1:
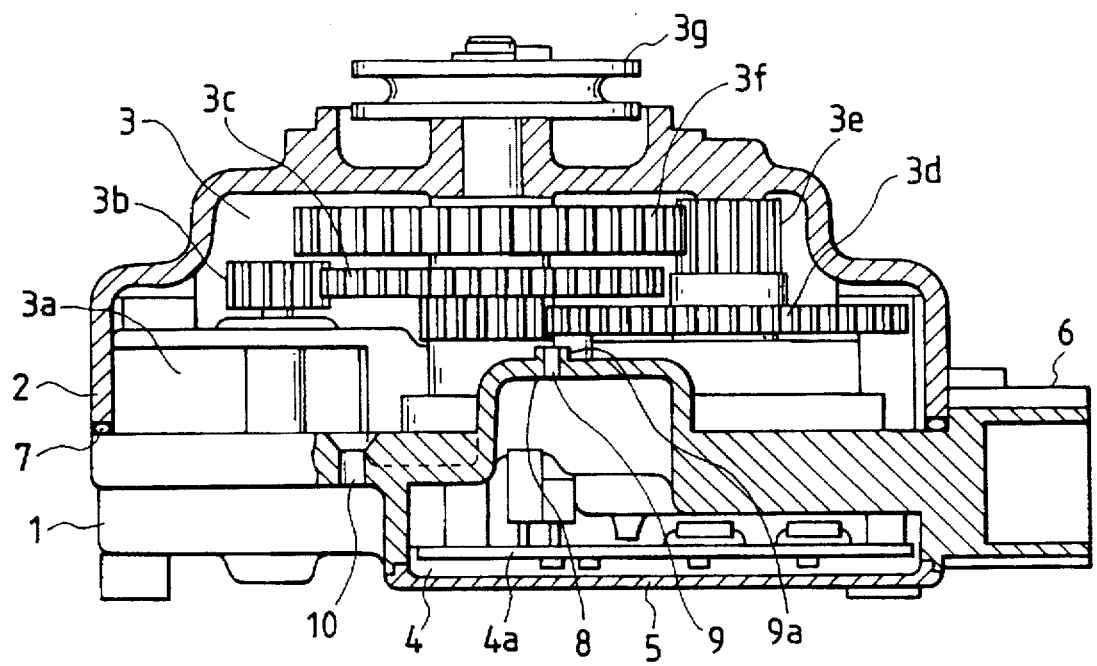
FIG. 1 is a sectional view showing the first embodiment of the present invention.

FIG. 1 is a sectional view showing an embodiment of an actuator integrated to a control section according to the present invention. In FIG. 1, like reference numerals refer to like parts in the conventional actuator described above. In the figure, reference numeral 1 denotes a case which constitutes a mechanism section housing chamber 3 together with a mechanism cover section cover 2 as in the conventional actuator. In the mechanism housing chamber 3, a motor 3a serving as a power source and a group of speed-reduction gears 3b to 3f are provided. The output from the motor 3a, which is speed-reduced through the group of gears 3b to 3f, is transmitted to a power output member 3g provided outside the mechanism section housing chamber 3.

Reference numeral 4 denotes a control section housing chamber having a control section 4a, and is constituted by a control section cover 5 welded to the case 1 and a partition 8 of the case. The partition 8 serves to isolate the mechanism section housing chamber 3 and the control section housing chamber 4 from each other. Reference numeral 9 denotes a ventilating opening provided in said partition 8 and communicating said mechanism section housing chamber 3 and the control section housing chamber 4. A cylindrical protrusion 9a is provided on the partition 8 so as to surround the ventilating opening 9 and to be located within the mechanism section housing chamber 3. Reference numeral 10 denotes a drain hole for communicating the mechanism section housing chamber 3 with outside-air. The drain hole 10, in an actuator mounting state, is provided at a position in the neighborhood of the lower end of the mechanism section housing chamber 3 and at least lower than the ventilating opening 9. Reference numeral 6 denotes a connector having a terminal (not shown), and reference numeral 7 denotes a sealing member.

The control-section integrated actuator thus configured, in which the control section cover 5 and the case 1 are welded at their fitting portion as in the conventional actuator, has sufficient waterproof capability of waterproof against ordinary water pouring for the control section housing chamber 4 from outside. In addition, in the actuator according to this embodiment, since the control section housing chamber 4 is communicated with the mechanism section housing chamber 3 through the ventilating opening 9, and the drain hole 10 is provided in the mechanism section chamber 3, a pressure difference from the outdoor air does not occur. For this reason, when water pouring at a high temperature is executed, water intrusion into the control section housing chamber 4 by the breathing operation and malfunction and fracture of the control section 4a attendant thereon can be prevented. Further, the drain hole 10, in an actuator mounting state, is provided at a position in the neighborhood of the lower end of the mechanism section housing chamber 3 and at least lower than the ventilating opening 9, and on the side of the mechanism section housing chamber 4 of the ventilating opening 9, a cylindrical protrusion 9a is provided on the partition 8. For this reason, the water splashed and intruded from the drain hole 10 into the mechanism section housing chamber 3 is blocked by the cylindrical protruding portion 9a and does not flow into the control section housing chamber 4. Accordingly, a reliable control section integrated type actuator free from trouble due to water can be accomplished.

Embodiment 2

Figure 2A:
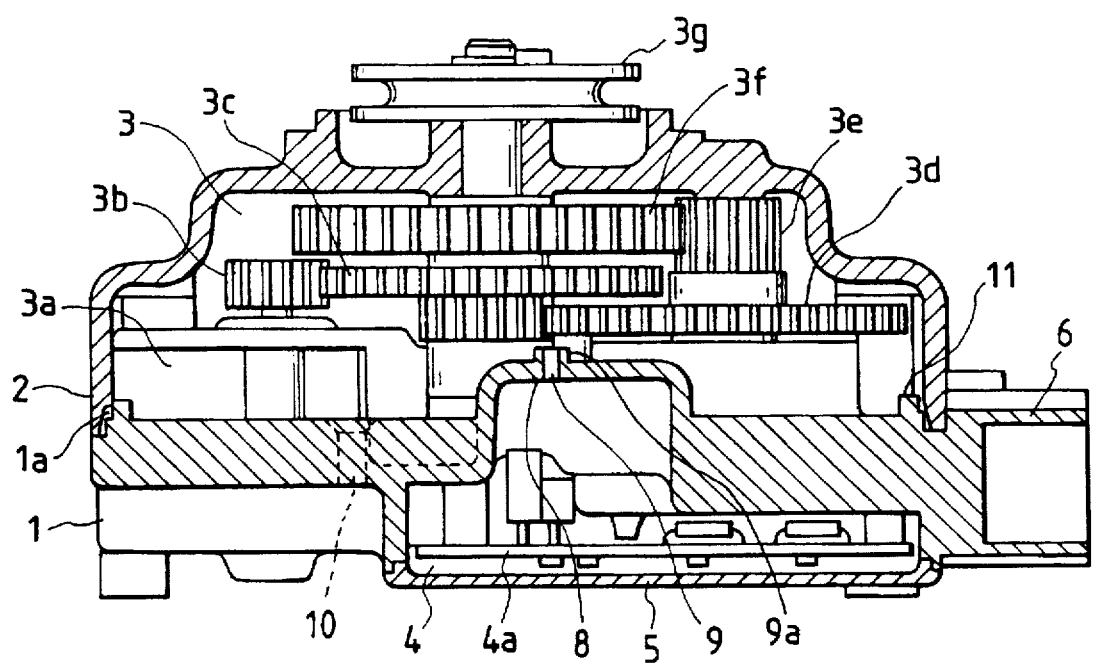
FIGS. 2A and 2B are sectional views showing the second embodiment of the present invention.
Figure 2B:
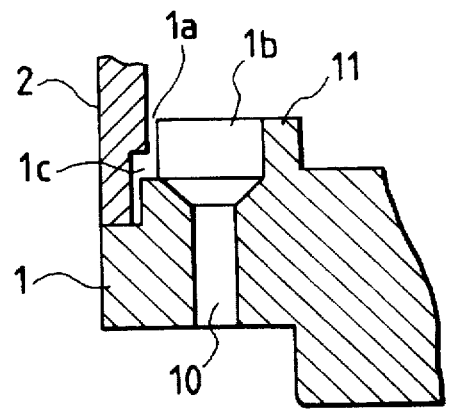
Figure 2C:
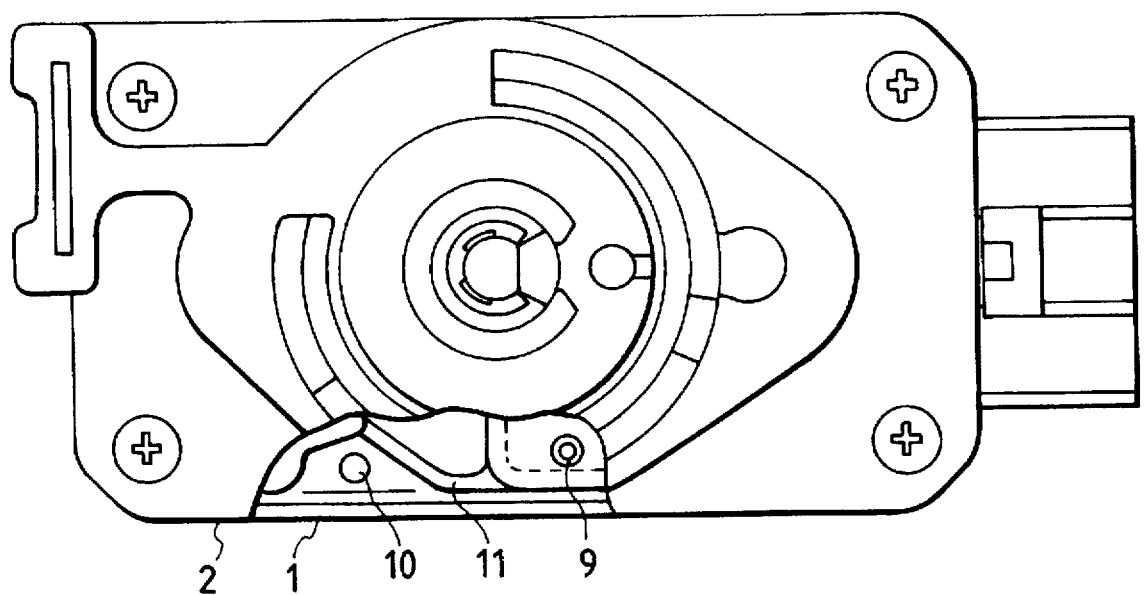
FIG. 2C is a partially cut-away plane view showing the second embodiment.

FIGS. 2A and 2B are sectional views showing the second embodiment, and FIG. 2C is a partially cut-away plane view showing the second embodiment. As seen from the figures, in the mechanism section housing chamber 3, a waterproof wall 11 is provided on the case 1 so that it is inscribed to the inner surface of the mechanism section cover 2 through a small gap 1a. Further, as shown in FIG. 2B, a partially enlarged portion 1b is formed in the small gap 1a between the mechanism section cover 2 and waterproof wall 11, and at the partially enlarged portion 1b, the drain hole 10 is provided. The waterproof wall 11 serves to prevent splashing and intrusion of water into the mechanism section housing chamber 3 and improve waterproof capability for various members within the mechanism section housing chamber 3 and the ventilating opening 9 communicating with the control section housing chamber 4. Further, the water intruded from between the mechanism section cover 2 and the case 1 will not reach the various members within the mechanism section housing chamber 3 and the vicinity of the ventilating opening 9, but can be drained from the drain hole 10 through a gap 1c. Thus, removal of the sealing member provided between the mechanism section cover 2 and the case 1 does not lead to trouble due to water intrusion. This makes it unnecessary to use the sealing member and execute its troublesome attaching. Accordingly, the productivity of the actuator can be improved while the waterproof capability is maintained.

Embodiment 3

Figure 3:
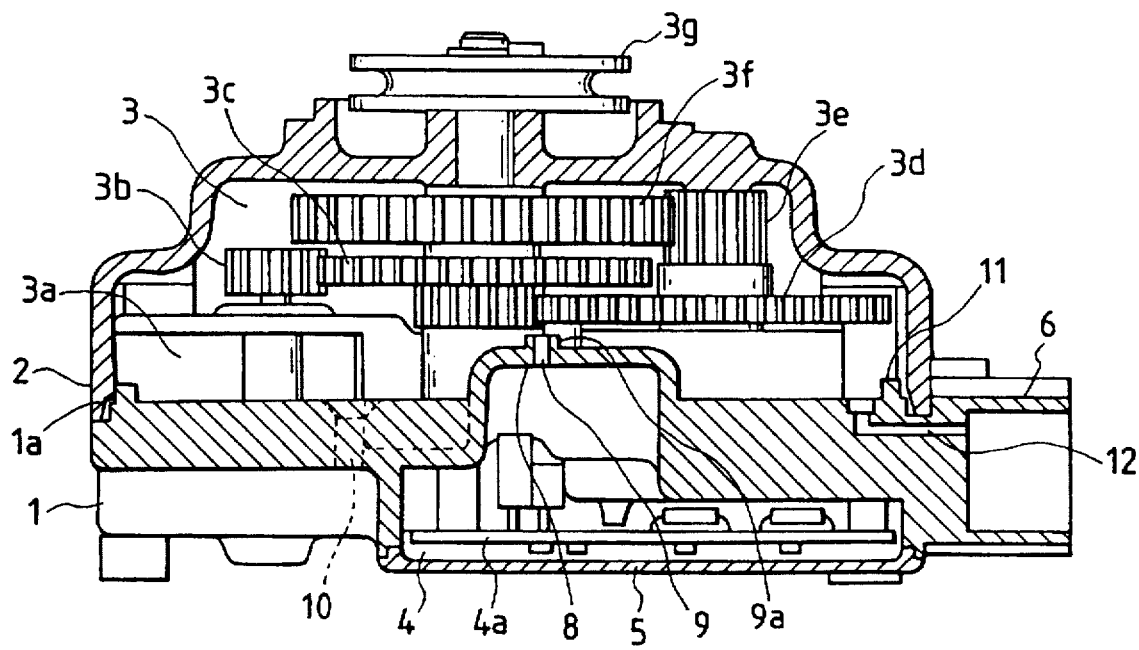
FIG. 3 is a sectional view of the third embodiment of the present invention.
Figure 4:
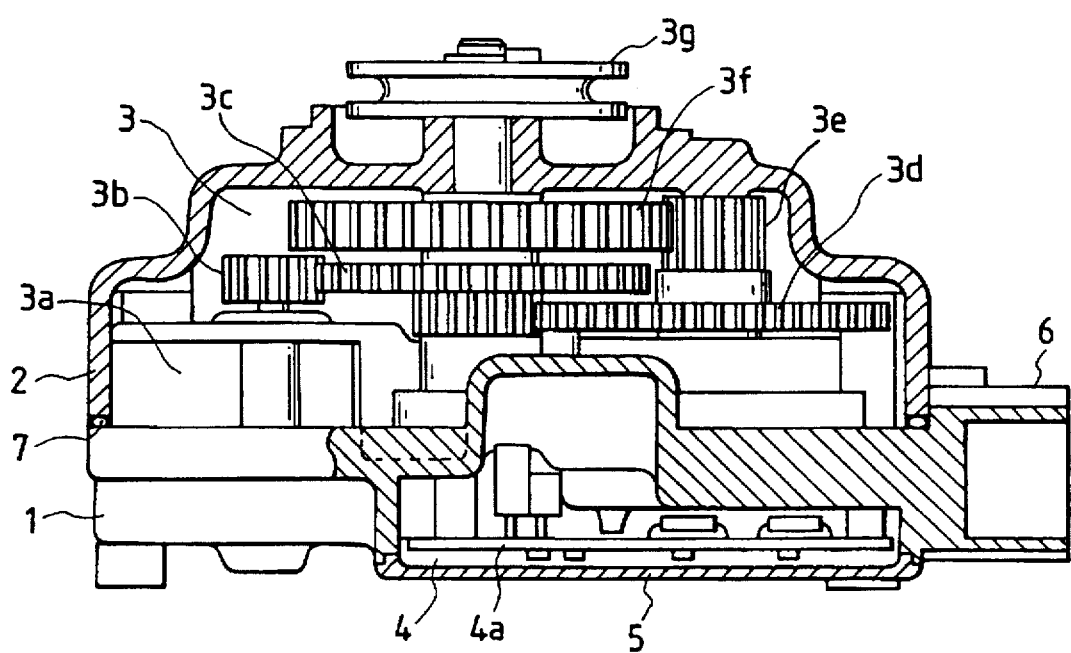
FIG. 4 is a sectional view showing a structure of an actuator.

FIG. 3 is a sectional view showing the third embodiment of the present invention, in which a ventilating opening 12 is provided between the inside of the waterproof wall 11 of a mechanism section housing chamber 3 and the interior of a connector 6. The waterproof type connector can maintain waterproof capability in its interior by insertion of a plug into a receptacle, but when a pressure difference due to temperature changes occurs, it suffers from water sucking by a breathing operation into the interior of the connector 6. In accordance with this embodiment, since the ventilating opening 12 communicating the connector 6 and the mechanism section housing chamber 3 is provided, a pressure difference due to a temperature change is not generated between the interior of the connector 6 and the outside air, thus preventing the short-circuiting between terminals due to water sucking.

What is claimed is:

1. An actuator device comprising:
a mechanism section housing chamber, constituted by a case and a cover, for housing a mechanism section generating power;
a control section housing chamber, configured integrally to said mechanism section housing chamber, for housing a control section controlling said mechanism section;
a partition, arranged between said mechanism section housing chamber and said control section housing chamber, for isolating these chambers from each other;
a ventilating opening, provided in said partition, for communicating said mechanism section housing chamber and said control section housing chamber;
a cylindrical protrusion, provided on said partition within said mechanism section housing chamber, for surrounding the ventilating opening; and
a drain hole, provided at a position lower than that of said ventilating opening, for communicating said mechanism section housing chamber with outside-air.

2. An actuator according to claim 1, further comprising:
a waterproof wall provided in said case at a junction between said case and said mechanism section cover so that it is opposite to the inner surface of said mechanism section cover through a small gap, wherein said small gap between the mechanism section cover and waterproof wall is partially enlarged, and said drain hole is provided at the enlarged portion of said small gap.

3. An actuator device according to claim 1, further comprising:
a connector section for supplying a control signal and electric power to said control section; and
a ventilating opening for communicating said connector section and said mechanism section housing chamber.

4. An actuator device according to claim 2, further comprising:
a connector section for supplying a control signal and electric power to said control section; and a ventilating opening for communicating said connector section and said mechanism section housing chamber.

5. An actuator device according to claim 1, wherein said control section housing chamber is communicated with the outside-air through said ventilating opening, mechanism section housing chamber and drain hole.

6. An actuator device according to claim 1, wherein said control section is constituted by said case and a control section cover sealingly attached to said case.

* * * * *